US011897102B2

(12) United States Patent
Evans et al.

(10) Patent No.: US 11,897,102 B2
(45) Date of Patent: Feb. 13, 2024

(54) HYDRAULIC SCREW TENSIONER

(71) Applicant: ATLAS COPCO INDUSTRIAL TECHNIQUE AB, Stockholm (SE)

(72) Inventors: David Michael Evans, Sedgley (GB); Adam Thomas Lee, Dudley (GB)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 17/901,465

(22) Filed: Sep. 1, 2022

(65) Prior Publication Data

US 2022/0410356 A1 Dec. 29, 2022

Related U.S. Application Data

(63) Continuation of application No. 16/330,145, filed as application No. PCT/EP2016/072711 on Sep. 23, 2016, now abandoned.

(51) Int. Cl.
*B25B 29/02* (2006.01)

(52) U.S. Cl.
CPC .................................... *B25B 29/02* (2013.01)

(58) Field of Classification Search
None
See application file for complete search history.

(56) References Cited

U.S. PATENT DOCUMENTS

| | | | | |
|---|---|---|---|---|
| 4,708,036 | A | 11/1987 | Vossbrinck | |
| 4,846,444 | A | 7/1989 | Vassalotti | |
| 4,998,453 | A | 3/1991 | Walton et al. | |
| 6,840,726 | B2 * | 1/2005 | Gosling | B23P 11/022 411/339 |

(Continued)

FOREIGN PATENT DOCUMENTS

| | | | | |
|---|---|---|---|---|
| CN | 105619139 A | 6/2016 | | |
| DE | 102006056287 A1 * | 6/2008 | | F16L 35/00 |

(Continued)

OTHER PUBLICATIONS

Translation of DE102006056287A1, retrieved from espacenet on Apr. 5, 2023 (Year: 2008).*

(Continued)

*Primary Examiner* — Tom Rodgers
(74) *Attorney, Agent, or Firm* — Holtz, Holtz & Volek PC

(57) ABSTRACT

A hydraulic screw tensioning device includes a tubular body, with a through opening and an annular cylinder chamber surrounding the through opening and a tubular piston movably supported in the tubular body and connectable to a screw to be tensioned. The tubular piston includes a stepped outer portion and divides the annular cylinder chamber into a first pressure chamber and a second pressure chamber. The second pressure chamber is closed by an annular end cap secured to the tubular body. The first pressure chamber is connectable to a pressure source for hydraulic fluid. The second pressure chamber is connectable to a pressure source for a compressible medium via a conduit connector mounted on the annular end cap. The conduit connector extends radially in relation to a geometric axis (A-A) of the tubular body. A damage protecting structure is provided to protect the conduit connector against accidental physical damage.

4 Claims, 2 Drawing Sheets

(56) References Cited

U.S. PATENT DOCUMENTS

| | | | |
|---|---|---|---|
| 7,658,131 B1 | 2/2010 | Rosa et al. |
| 8,443,831 B2 | 5/2013 | Hohmann et al. |
| 2011/0192257 A1 | 8/2011 | Armstrong |
| 2014/0245868 A1 | 9/2014 | Wagner et al. |

FOREIGN PATENT DOCUMENTS

| | | |
|---|---|---|
| GB | 2427667 A | 1/2007 |
| GB | 2457138 A | 8/2009 |

OTHER PUBLICATIONS

Chinese Office Action dated Apr. 20, 2020 issued in Chinese Application No. 201680089461.8.
International Search Report (ISR) and Written Opinion dated Jun. 8, 2017 issued in International Application No. PCT/EP2016/072711.

* cited by examiner

HYDRAULIC SCREW TENSIONER

This application is a Continuation application of U.S. application Ser. No. 16/330,145, filed Mar. 4, 2019, which is a 371 National Stage Entry of PCT/EP2016/072711, filed on Sep. 23, 2016, the entire contents of both of which are incorporated by reference herein.

The invention relates to a hydraulic device for pre-tensioning a threaded element forming part of a joint between two parts of a structure. In particular, the invention concerns a hydraulic device for applying an axial pre-tensioning force on a threaded element, such as a bolt or screw, to thereby obtain a desired and well defined clamping force of the joint.

Hydraulic screw tensioners are used to obtain a desired clamping force of one or more screws comprised in a joint of two parts, in particular a critical joint of a larger dimension. Applying an axial tension force on a screw and observing the obtained elongation of the screw is a very accurate method to determine the clamping force actually obtained by the screw, given the physical properties of the screw material. Having reached the desired elongation of the screw and hence the clamping force target the screw is locked by a nut to preserve the tension obtained.

A prior art tensioning device comprises a tubular body intended to be supported on either one of the parts to be joined and comprising a cylinder, and a tubular piston movably supported in the cylinder, wherein the piston is intended to surround a screw or bolt to be tensioned. The piston has a stepped shape and forms together with the cylinder a first pressure chamber to be connected to a pressure source of an active hydraulic fluid, and a second chamber to be connected to pressure source of a compressible piston biasing medium like air. A threaded portion formed on the piston itself or on a tubular insert carried by the piston is intended to engage the thread of the screw or bolt forming part of the joint to thereby transfer a tensioning pulling force created by the piston onto the screw or bolt. The reaction force developed in the body as a result of this pulling force is transferred to the surface of the joint adjacent the screw being tensioned via an extension or bridge portion of the body.

A screw tensioning device of this type is previously described in patent: GB 2457138.

In the tensioning device disclosed in the above document the first and second chambers formed between the cylinder and the piston are connected to their respective external pressure sources via conduit connectors which are mounted on the piston and extend in a direction parallel with the geometric axis of the cylindrical tensioning device body. However, this arrangement has proven to be a problem in applications not only where the available space in the axial direction above or outside the device is limited but also in applications where a number of tensioning devices are applied on oppositely directed screws of a joint and these devices are to be connected in series. In that case the conduit routing between the different devices will be rather cumbersome and space demanding.

In another prior art device of a similar type but lacking the piston biasing feature of the compressible medium type the problem with awkward conduit routing has been addressed by locating the conduit connector or connectors for the hydraulic fluid in a radial fashion in relation to the axial direction of the body. Accordingly, this prior art device lacks a conduit connector for a compressible medium, but in the same way as for the hydraulic fluid conduit connector a conduit connector for a compressible medium has to be oriented in a radial fashion to facilitate conduit routing at a multiple tensioning device arrangement.

It is an object of the invention to avoid the above described conduit routing problem by providing a hydraulic screw tensioning device of the initially described type wherein the conduit connectors for both the hydraulic fluid and the compressible piston biasing medium are directed radially relative to the geometric axis of the cylindrical body of tensioning device.

Another object of the invention is to avoid the above described conduit routing problem by providing a hydraulic screw tensioning device of the initially described type, wherein the conduit connector for the compressible piston biasing medium is carried on and extending in a radial direction from an annular end cap mounted on the cylindrical body of the tensioning device.

A further object of the invention is to avoid the above described conduit routing problem by providing a hydraulic screw tensioning device of the initially described type, wherein the conduit connector for the compressible piston biasing medium is carried on and extending from an annular end cap mounted on the cylindrical body of the tensioning device body and a means is provided to protect mechanically the conduit connector for compressible piston biasing medium.

Other objects and advantages of the invention will appear from the following specification and claims.

A preferred embodiment of the invention is described below in detail with reference to the accompanying drawings.

In the drawings

Figure 1:
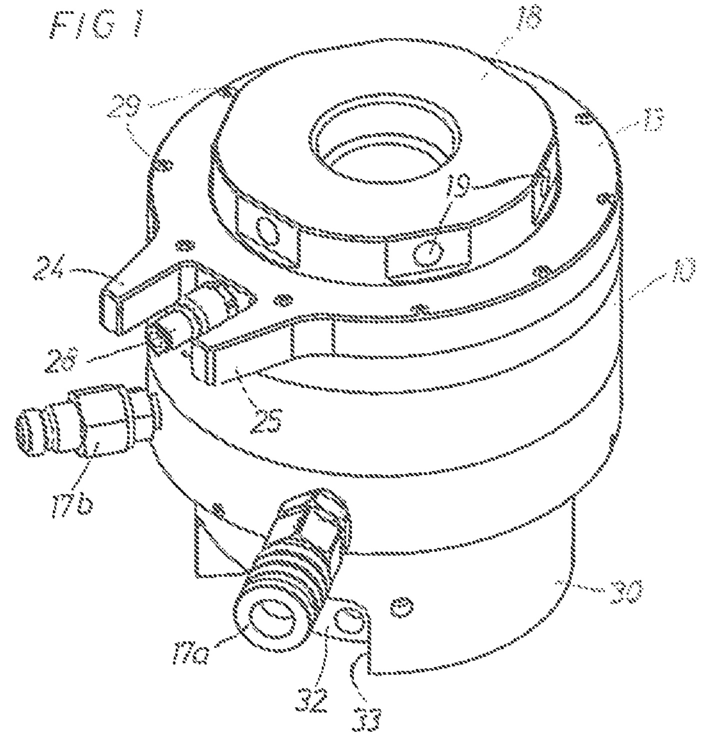
FIG. 1 shows a perspective view of a screw tensioning device according to the invention.
Figure 2:
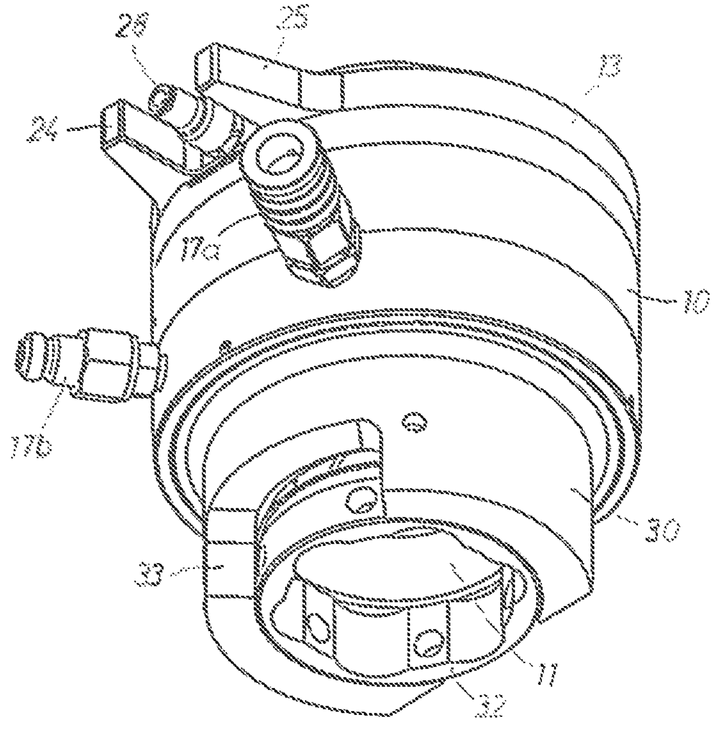
FIG. 2 shows a perspective view of the device in FIG. 1 but illustrates the device from screw joint side.

The screw tensioning device shown in the drawing figures comprises a tubular body 10 having a central through opening 11 and an annular cylinder chamber 12 located laterally of the through opening 11. The body 10 has a geometric axis A-A extending through the opening 11. The cylinder chamber 12 is axially closed by an annular end cap 13. An annular piston 14 is operable in the annular cylinder chamber 12 and has a stepped portion 14*a* on its outside, whereby the piston 14 forms a first pressure chamber 15 by its end surface and a second pressure chamber 16 by its stepped portion 14*a*. The first pressure chamber 15 is connected to an external pressure source for hydraulic fluid via a conduit connector 17*a* mounted on the body 10 and extending radially therefrom. By introducing hydraulic fluid under pressure in the first pressure chamber 15 the piston 14 will perform a working stroke. Another conduit connector 17*b* is mounted on the body 10 and communicating with first pressure chamber 15. This connector 17*b* is intended to receive a conduit for series connection of two or more tensioning devices at multi-screw joints.

The piston 14 is tubular and receives a tubular insert 18 which is formed with an internal thread for engagement with the thread of a screw or bolt to be tensioned by the device. This insert 18 is preferably one of a number of interchangeable inserts with different threads to adapt the device to screws or bolts with different types of threads. At its outer end the insert 18 is formed with a flange 21 in contact with the piston 14 to transfer the pulling force developed by the latter to the screw being tensioned. The insert 18 is freely movable relative to the piston 14 and provided with dents 19 on its periphery to be engaged by a tool when loosening the insert from the screw at a completed tensioning process.

The second pressure chamber 16 is intended to be pressurized by a compressible medium, preferably air, to develop a biasing force on the piston 14 in the reverse direction, i.e. the direction opposite the working stroke direction. The compressible medium is supplied from a pressure source via a conduit connector 28 mounted on the end cap 13 and extends in a radial direction therefrom. This conduit connector 28 is mounted at the periphery of the end cap 13 and communicates with the second pressure chamber 16 via a passage 26 in the end cap 13. The passage 26 also comprises a non-illustrated check valve to prevent medium from escaping during working strokes of the piston 14.

A couple of protrusions 24,25 are formed integrally with the end cap 13 and extend radially on both sides of the conduit connector 28. These protrusions 24,25 are intended to form a physical damage protection for the conduit connector 28. An accidental force or blow on the conduit connector 28 might also cause a damage to the end cap 13, because the latter is somewhat weakened at the connection point for the conduit connector 28 and could easily be damaged in case an accidental force or blow hits the connector 28.

The annular end cap 13 is secured to the body 10 by a number of equally spaced screws 29 which gives an option to locate the end cap 13 in a number of alternative angular positions to provide the most favorable position of the conduit connector 28 as to the conduit routing.

For the purpose of transferring the reaction force developed in the body 10 as a result of the pulling force applied on a screw during tensioning the body 10 is formed with a tubular support extension 30. This extension 30 is intended to take support on a surface of the joint adjacent the screw being tensioned. The support extension 30 is formed with an inner cylindrical socket 31 in which a nut engaging coupling ring 32 is supported, and the support extension 30 comprises a lateral opening 33 through which the coupling ring 32 is accessible for rotation.

In operation the tensioning device is applied on a screw to be tensioned with the screw extending through the body 10 and the piston 14. Before that a nut has been threaded onto screw into engagement with the surface of the structure containing the joint and the nut engaging ring 32 is put into engagement with the nut. As the body 10 is properly fitted over the joint the insert 18 is threaded onto the screw until a firm contact between the insert flange 21 and the piston 14 is obtained. As the device is accurately put in place on the screw the tubular extension 30 of the joint rests on the surface of the structure containing the joint so as to transfer the reaction force developed during the tensioning process to the structure.

Figure 3:
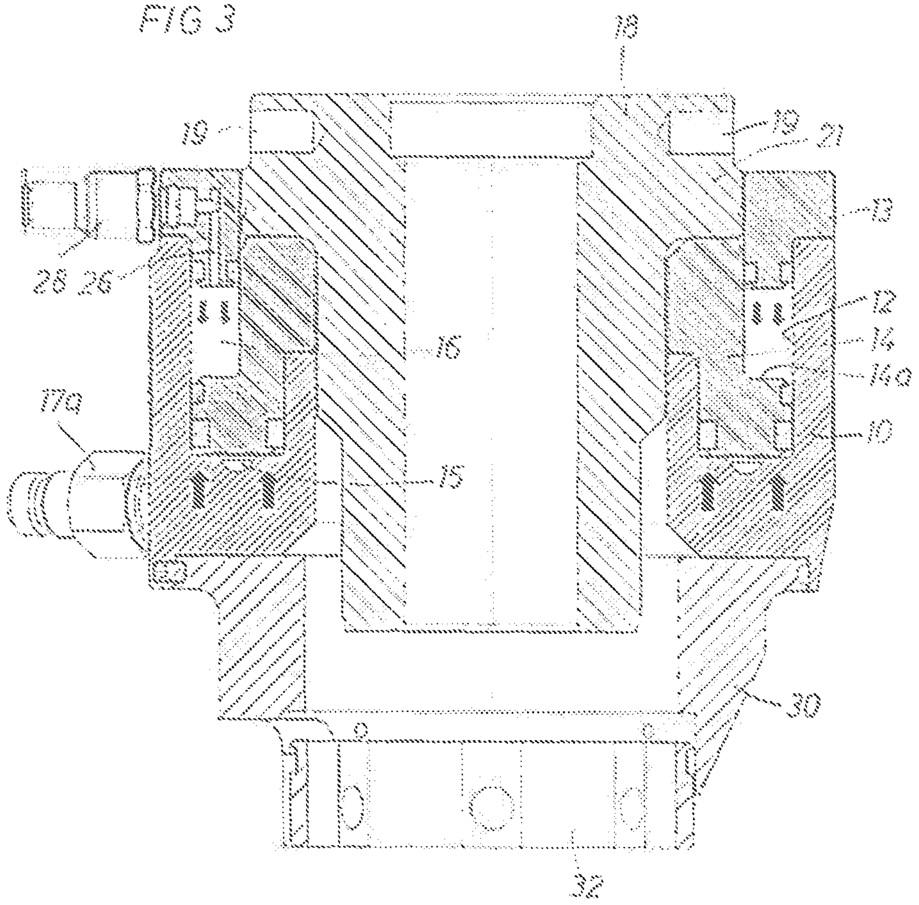
FIG. 3 shows a longitudinal section through the device in FIGS. 1 and 2.

The conduit connectors 17*a* and 28 are connected to the sources of hydraulic fluid and compressible medium, respectively, and the operation is commenced by supplying compressible medium to the second pressure chamber 16 thereby ensuring that the pressure obtained in pressure chamber 16 displaces the piston 14 to its rearmost or starting position before the actual tensioning process is started. Due to the action of the check valve fitted in the inlet passage 26 the amount of pressure medium introduced in the second pressure chamber 16 will remain unchanged during the tensioning process. Then hydraulic fluid is fed into the first pressure chamber 15 whereby an active working force is applied on the piston 14. This results in a movement of the piston 14, and a pulling force is transferred to the screw via the threaded insert 18. As the piston 14 moves through the cylinder 12 the tension in the screw increases, while at the same time the volume of the second pressure chamber 16 decreases and due to the passage 26 being closed by the check valve the decreasing volume results in a pressure increase of the compressible medium. The pressure related forces obtained in the first and second pressure chambers 15 and 16, respectively, are illustrated by arrows in FIG. 3.

As a desired pretension level is reached in the actual screw the pressure increase in the first pressure chamber 16 is stopped and the coupling ring 32 is rotated by means of a suitable tool applied via the lateral opening 33 in the support extension 30. The nut is rotated until it is firmly engaged with the surface of the joint and apt to maintain the obtained tension in the screw after the action of the hydraulic pressure is seized. This ends the tensioning process and the piston 14 is pushed back to its start position by the medium pressure in the second pressure chamber 16, whereby the hydraulic fluid is pressed out of the first pressure chamber 15. The threaded insert 18 is removed from the screw and the entire device is lifted off the screw to thereby complete the screw tensioning process.

The invention claimed is:

1. A hydraulic screw tensioning device comprising:

a tubular body having a through opening formed therethrough and an annular cylinder chamber surrounding the through opening; and a tubular piston movably supported in the tubular body and connectable to a screw to be tensioned, wherein:

the tubular piston comprises a stepped outer portion and divides the annular cylinder chamber into a first pressure chamber and a second pressure chamber, the second pressure chamber is closed by an annular end cap secured to the tubular body, the first pressure chamber is connectable to a pressure source for hydraulic fluid, the second pressure chamber is connectable to a pressure source for a compressible medium via a conduit connector mounted on the annular end cap, the conduit connector extends radially outward from the annular end cap in relation to a central axis of the tubular body, and the annular end cap comprises two protrusions extending radially outward from the annular end cap with the conduit connector mounted on the annular end cap between the two protrusions, wherein the annular end cap has a top surface and the two protrusions extend from the top surface with the conduit connector extending in parallel with the two protrusions.

2. The hydraulic screw tensioning device according to claim 1, wherein the conduit connector communicates with the second pressure chamber.

3. The hydraulic screw tensioning device according to claim 2, wherein the annular end cap is secured to the tubular body in at least two alternative angular positions enabling the conduit connector to occupy different radial directions in relation to the tubular body.

4. The hydraulic screw tensioning device according to claim 1, wherein the annular end cap is secured to the tubular body in at least two alternative angular positions enabling the conduit connector to occupy different radial directions in relation to the tubular body.

* * * * *